Figure 1:
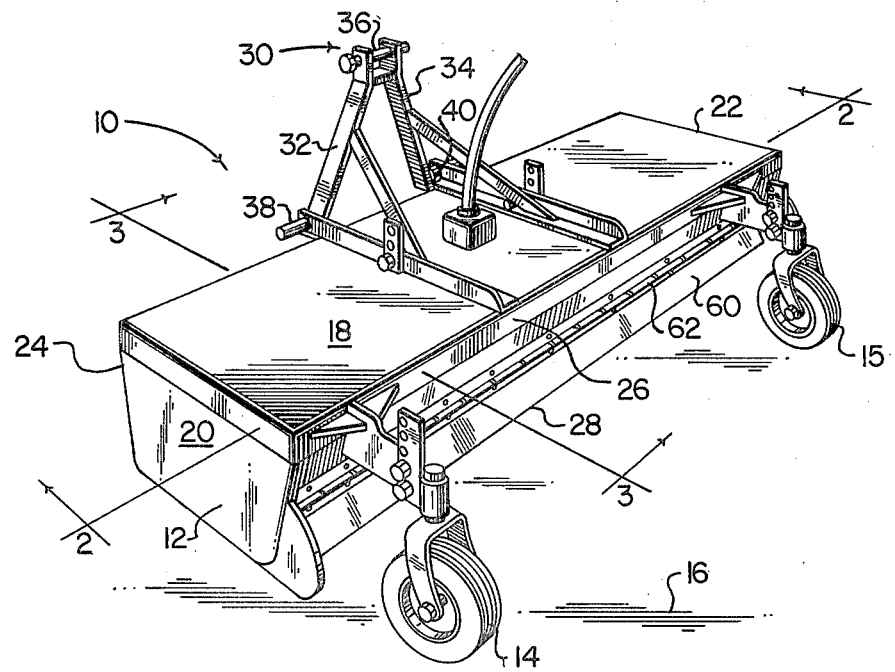
Figure 2:
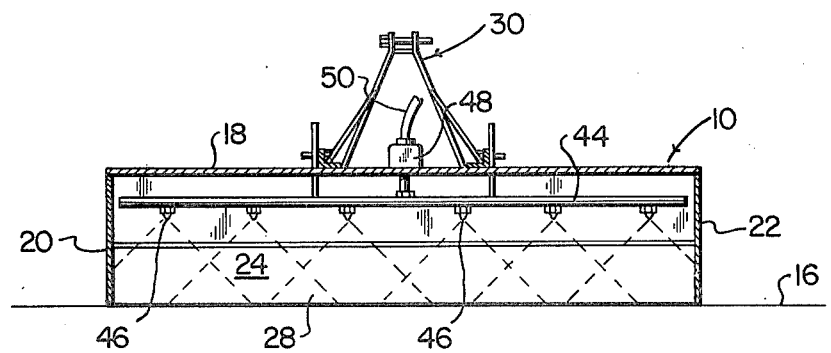

United States Patent [19]

Kinder

[11] 4,186,879
[45] Feb. 5, 1980

[54] DRIFT FREE SPRAYING APPARATUS

[76] Inventor: Leon Kinder, 400 Hunter's Creek Rd., Denton, Tex. 76201

[21] Appl. No.: 840,656

[22] Filed: Oct. 11, 1977

[51] Int. Cl.² .............................. B05B 1/20; B05B 1/28
[52] U.S. Cl. .................................... 239/172; 239/159; 280/415 R
[58] Field of Search ............... 239/159, 172, 287, 288, 239/288.3, 288.5, 164, 176, 661; 280/456 A, 461 A, 465, 490 A, 415 R; 56/500, 503, 504, 320.1

[56] References Cited

U.S. PATENT DOCUMENTS

| 2,551,870 | 5/1951 | Bridger | 280/490 A X |
|---|---|---|---|
| 2,581,678 | 1/1952 | Malin et al. | 239/287 X |
| 2,740,664 | 4/1956 | Yates | 239/287 X |
| 3,118,607 | 1/1964 | Rocher | 239/287 X |
| 3,512,714 | 5/1970 | Phelps et al. | 239/159 X |
| 3,601,314 | 8/1971 | Hurt | 239/288.5 X |
| 3,802,172 | 4/1974 | Mathews | 56/504 X |
| 4,015,855 | 4/1977 | Murray | 280/461 A X |
| 4,023,507 | 5/1977 | Van der Lely | 239/287 X |

Primary Examiner—Johnny D. Cherry
Attorney, Agent, or Firm—Crisman & Moore

[57] ABSTRACT

A towable spraying device for attachment to a tractor, truck, or the like, for drift free spraying of chemicals such as herbicides and pesticides in a confined area in any wind condition. An elongated surface engaging spray housing is provided for attachment to a towing vehicle and includes an inner tubular member having a plurality of nozzles thereon for dispensing spray therefrom between fore and aft, elongated flexible baffles constructed upon the housing. The flexible baffles comprise lower portions of the fore and aft wall sections of the housing which permit same to engage and glide over rough terrain while substantially confining the spray therein. Spray such as insecticides can therein be applied to foliage and other ground surfaces in a controlled manner wherein extraneous contamination must be prevented.

6 Claims, 5 Drawing Figures ced to provide spraying apparatus which could incorporate optimal spray

DRIFT FREE SPRAYING APPARATUS

BACKGROUND OF THE INVENTION

The invention relates to an apparatus for spraying chemicals, and, more particularly, to a herbicide spraying unit adapted for towable attachment to a tractor to facilitate drift free spraying.

It is generally the practice when spraying chemicals such as herbicides and insecticides to eject the chemical in a fine mist upon the foliage being treated. Oftentimes however, winds cause the mist to drift away from the subject foliage before same is contacted. This creates two problems. First, the purpose of the spraying is frustrated in that the subject foliage is not treated. Secondly, the drift of the spray often contacts areas which are detrimentally affected by the spray. This twofold problem has been addressed by certain prior art spraying devices which have provided "focusing" spray nozzles which intensify the spray stream to reduce drift contamination. However, such devices generally alter the mist characteristics of the chemical and reduce the treatment effectiveness thereof.

Other prior art approaches to reducing spray contamination caused by drift have included spray bars designed for use very close to the sprayed surface whereby the spray pressure can be substantially reduced. Such an effect reduces mist drift but also reduces the rate at which the chemical can be applied as well as the mist characteristics. Furthermore, nozzle modifications for controlling mist drift are generally inconsistent with optimal spraying configurations from a technical standpoint.

It would be an advantage therefore to provide spraying apparatus which could incorporate optimal spray nozzle configurations in an assembly providing confined spray application and the elimination of drift contamination. The invention of the present system is constructed for just such a purpose. The spray bar is enclosed in an elongated housing adapted for ambulatory surface engagement. The housing includes flexibly mounted fore and aft walls for conforming to uneven surfaces over which the housing is permitted to glide. The spray from the spray bar is confined therein during all wind conditions.

SUMMARY OF THE INVENTION

The invention relates to apparatus for towable ambulation behind a vehicle to effect confined spraying of underlying foliage. More particularly, one aspect of the invention includes an improved spraying apparatus of the type adapted for ambulation in connection with a vehicle and having a spray bar mounted in communication with a fluid pump and reservoir assembly adapted for emitting fluid in a mist configuration upon the surface to be sprayed through nozzles provided in the spray bar. The improvement in the spraying apparatus comprises an elongated housing having fore and aft walls adjacent first and second end walls and including the spray bar mounted therein for confined spraying therefrom. The housing includes a top wall interconnecting the fore, aft and side walls and is opposite an open lower portion adapted for abutting the surface to be sprayed. The fore and aft walls each include an elongated section flexibly mounted to the walls and adapted for abutting engagement with the surface to be sprayed and conformation with nonplanar areas thereof for confining spray thereon. The first and second end walls depend from the top wall in rigid interengagement therewith for supporting the housing upon the surface to be sprayed during travel thereover and confining the sprayed mist therebetween and between the fore and aft walls.

BRIEF DESCRIPTION OF THE DRAWINGS

A complete understanding of the present invention will be obtained from the following detailed description thereof when read in conjunction with the accompanying drawings, wherein:

FIG. 1 is a perspective view of one embodiment of apparatus for spraying chemicals in a confined area as constructed in accordance with the principles of the present invention;

FIG. 2 is a front elevational cross-sectional view of the housing and spray bar of the apparatus of FIG. 1 taken along lines 2—2 thereof;

FIG. 3 is a side elevational, cross-sectional view of the housing and spray bar of FIG. 1 taken along lines 3—3 thereof;

FIG. 4 is a perspective view of the apparatus of FIG. 1 connected to a truck through an adjustable hitch; and FIG. 5 is a side elevational view of the apparatus of FIG. 4 illustrating the operation and adjustability of the supporting hitch.

DETAILED DESCRIPTION

Referring first to FIG. 1, there is shown a perspective view of apparatus 10 for drift free spraying of chemicals such as herbicides, insecticides and/or pesticides in a confined area. A housing 12 of the apparatus 10 is preferably coupled to a conventional tractor (not shown) for towable operation over a surface 16 to be sprayed. The housing 12 is constructed of an elongated top wall 18 rigidly interconnecting opposite end walls 20 and 22, and fore and aft walls 24 and 26, respectively. Wheels 14 and 15 are provided outwardly of aft wall 26 for mobile support thereof. The bottom portion 28 of the housing 12 is open and is adapted for abuttingly facing surface 16 in close proximity thereto to confine spray thereon and prevent spray drift therefrom.

The housing 12 is preferably constructed of rigid sheet or plate metal, preferably welded one to the other and surface treated to resist the corrosive effects of the various types of conventional chemical sprays commonly utilized. A yoke assembly 30 is secured upon, and upstands from, the top wall 18 of the housing 12 for coupling to the tractor (not shown) or similar vehicle adapted for towing ambulation thereof as will be discussed in more detail below. The yoke 30, of the particular embodiment shown herein, thus includes port and starboard A-frame struts 32 and 34, respectively, interconnected through an upper pivot frame 36. Lower port and starboard pivot frames 38 and 40 are pivotally connected to the base of the struts 32 and 34, respectively. An hydraulic system (not shown) of conventional design for vehicles such as tractors is preferably provided for vertical, rectilinear movement of the housing 12 of this particular embodiment. The three point support of the housing 12 through the respective A-frame struts 32 and 34 thus facilitates such bidirectional actuation atop the surface to be sprayed.

Referring now to FIG. 2, there is shown a front elevational, cross-sectional view of the housing 12, illustrating the securement of a spray bar 44 therein. Spray bar 44 is preferably conventional design, incorporating a plurality of spray nozzles 46 thereon. Nozzles 46 are preferably angulated toward the surface 16 for the delivery of spray thereto. The bar 44 is provided in a length generally equivalent to the length of the housing 12 for the complete application of the select chemical in mist form to the faced surface 16 therebelow. The chemical is provided to the spray bar 44 through a fitting 48 seated through the top wall 18 of the housing 12. A flexible hose 50 carries the chemical thereto from a pump and reservoir assembly shown diagrammatically as element 13, disposed upon and secured to the tractor or appropriate vehicle. The pump is preferably of the type adapted to be powered by the conventional power train of vehicles such as tractors.

Figure 3:
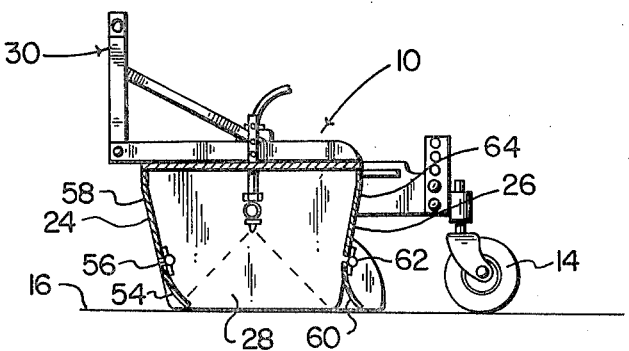
Figure 4:
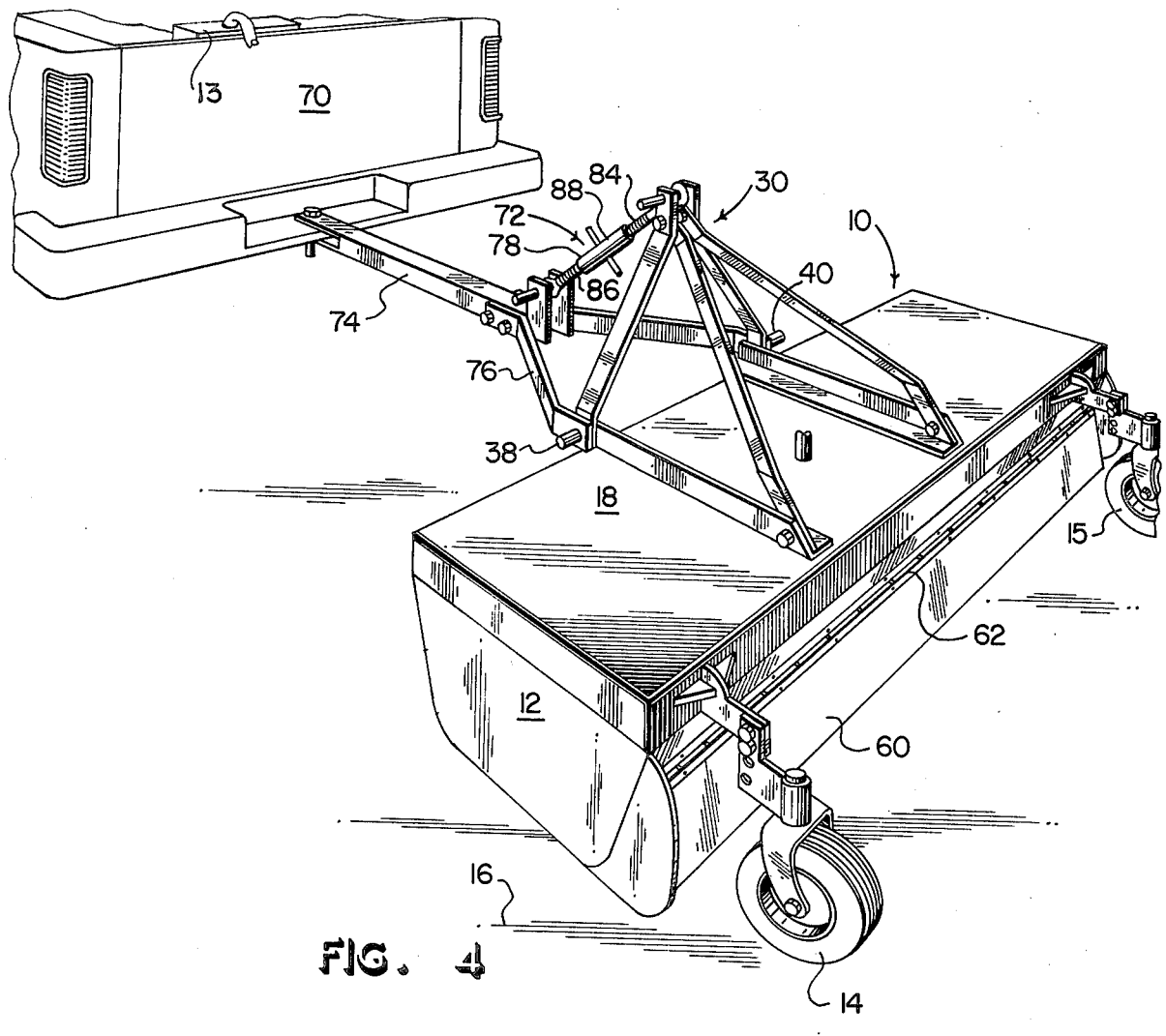
Figure 5:
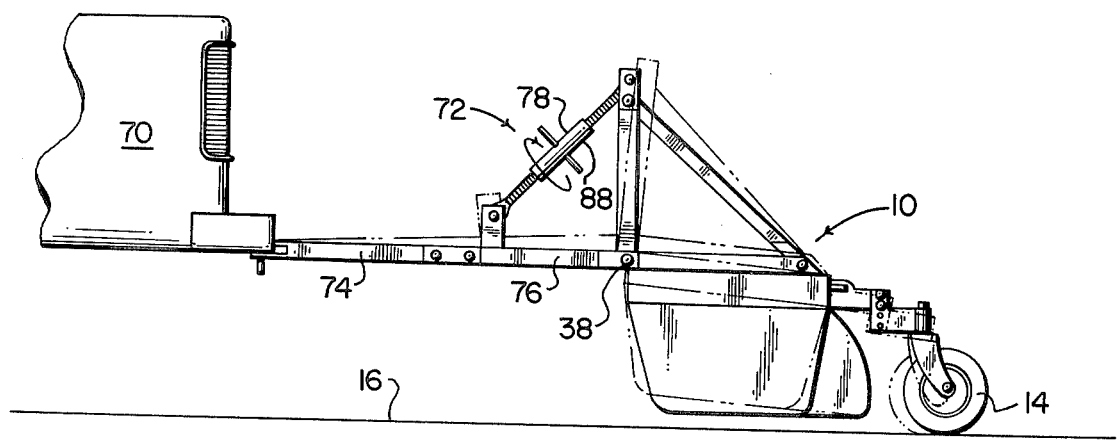

Referring now to FIG. 3, there is shown a side elevational, cross-sectional view of the housing 12, illustrating the angular deflection of the lower sections of fore and aft walls 24 and 26, respectively. Fore wall 24 may thus be seen to be comprised of a lower flexible section 54, connected along a hinge 56 to the upper wall section 58 thereof. Upper wall 58 is preferably rigidly secured to the top and side walls of the housing 12 through welding, or the like, and is preferably made of similar material. The lower flexible section 54 is preferably formed of rubber, or the like, which is adapted for conforming to irregularities on the surface 16. For purposes of example only, "Neoprene" rubber of a thickness on the order of one-half inch has been found satisfactory. Such a material and thickness is durable enough to withstand the application of corrosive chemicals such as insecticides, herbicides and/or pesticides of conventional manufacture.

Still referring to FIG. 3, there is shown the construction of aft wall 26, being comprised of a lower flexible section 60 connected along a hinge 62 to the upper wall section 64 thereof. Upper wall 64 is preferably rigidly secured to the top and side walls of the housing 12 through welding, or the like, and is, also, preferably made of similar material. The lower flexible section 60 is also preferably formed of rubber, or the like, adapted for conforming to irregularities on the surface 16. It may be seen that both flexible sections 54 and 60 are inclined in general parallelism with an angulation toward the fore wall 24. In this manner the flexible sections 54 and 60 glide over the surface 16 with least resistance while serving as baffles to confine spray within the housing 12.

In operation the tractor or suitable vehicle drive assembly powers the pump and reservoir to provide a spray emission as shown most clearly in FIG. 3. The spray, such as herbicides, is unaffected by wind currents outside the housing 12 and is applied to the foliage thereunder in the optimal mist configuration which, due to the wind free operation may be adjustably selected for specific applications. The particular structural embodiment of the apparatus 10 permits the housing 12 to glide over the surface 16 in very close proximity thereto. Unlike most prior art structures, this relationship is maintained in bumpy terrain and the degree of drift from wind blowing under the housing 12 is effectively negated. Due to the rectilinear translation of the housing 12 provided through the yoke 30 when engaging a tractor having a hydraulic system the apparatus 10 is never incapacitated due to the surface irregularities of any size. With a conventional hydraulic float setting on the yoke 30 the housing 12 can be rendered effectively weightless and/or suitably light to ride over furroughs and moguls. In this manner herbicides, fertilizers and surface treatment chemicals can be emitted in areas such as domed football stadiums without risk of lateral spray contamination. It is also possible to provide substantially equivalent functional results with vehicles not having hydraulic systems as discussed below.

As shown most clearly in FIG. 4, the sprayer 10 is showed secured to a truck 70 through one embodiment of an adjustable hitch 72 for towing therewith. The hitch 72 is comprised of a tongue 74, split yoke 76 and adjustment linkage 78. The yoke 76 engages the yoke 30 of the sprayer 10 through pivot frames 38 and 40. The sprayer 10 is then permitted to pivot about the wheels 14 and 15 and frames 38 and 40 through length changes in linkage 78. The linkage 78 is preferably constructed in the form of a turnbuckle having upper and lower threaded members 84 and 86, one of which incorporates lefthanded threads and the other righthanded threads. A compatible, center threaded unit 88 is provided for receiving and coupling said threaded members. As unit 88 is rotated the length of the linkage 78 is varied to cause selected pivoting about the wheels and height adjustment relative to the ground 16.

Referring now to FIG. 5 there is shown via the use of phantom lines a side elevational view of the sprayer 10 being adjusted relative to the ground 16. As may be seen from this illustration, adjustments in the linkage 78 impart latent movements to the tongue 74 and angulation of the sprayer 10 about the wheels 14 and 15. Since the wheels 14 and 15 are disposed substantially to the rear of the sprayer 10, angular movement thereacross is manifested in the main in height adjustment of said sprayer relative to the ground 16, although minor angular changes do occur. In this manner, once the wheels 14 and 15 are set for proper height relative to the sprayer 10, actual unit elevation adjustments may be easily facilitated through the linkage 78. Other ground curvature and related nonplanar areas are compensated for by the flexible sections discussed above.

It is thus believed that the operation and construction of the invention will be apparent from the foregoing description. While the spray apparatus thereof and turn hitch therefor shown and described have been characterized as being preferred, it will be obvious that various changes and modifications may be made without departing from the spirit and scope of the invention as defined in the following claims.

What is claimed is:

1. An improved spraying apparatus for pulling behind a vehicle over rough terrain and having a spray mechanism mounted in communication with a fluid pump and reservoir assembly adapted for emitting fluid in a mist upon a surface to be sprayed, said apparatus comprising:

an elongated housing having fore and aft walls adjacent first and second end walls and including the spray mechanism mounted therein for confined spraying;

said housing having a top wall interconnecting said fore, aft and end walls and opposite an open lower portion opening toward the surface to be sprayed;

said fore and aft walls each including an elongated section attached to said fore and aft walls and suitable for passing in close proximity to non-planar areas of the surface for confining spray within said housing;

said first and second end walls depending from said top wall for rigidly supporting said housing upon the surface to be sprayed during travel thereover and confining the sprayed mist therebetween and between said fore and aft walls;

said housing including at least one wheel for engaging the surface to be sprayed, said wheel being disposed to the rear and outwardly of said aft wall in rearward support of said housing, wherein said housing is adapted to be coupled to said vehicle in towable interconnection through a yoke assembly secured thereto;

said yoke assembly comprising a tongue having means for coupling to said vehicle on one end and a split yoke secured from the other end, said split yoke being attached to said spraying apparatus for towable engagement therewith, and having an adjustment linkage upstanding thereon for determining the angular orientation of said spraying apparatus relative to the surface to be sprayed.

2. An improved spraying apparatus as set forth in claim 1 wherein said spray mechanism is mounted adjacent said top wall and parallel to said fore and aft walls with the mist directed toward said open lower portion.

3. An improved spraying apparatus as set forth in claim 1 wherein said fore and aft walls each include a rigid upper section interconnecting said top wall and said first and second end walls and wherein said elongated sections are hingedly connected to said fore and aft walls.

4. An improved spraying apparatus as set forth in claim 3 wherein said elongated, hingedly connected sections of said fore and aft walls are comprised of elongated rubber partitions hingedly connected thereto and adapted for conforming to irregularities in the surface to be sprayed.

5. An improved spraying apparatus as set forth in claim 1 wherein said adjustment linkage is a turnbuckle and said split yoke is pivotally attached to said spraying apparatus.

6. An improved spraying apparatus as set forth in claim 1 wherein a pair of wheels extend rearwardly of said spraying apparatus for support thereof and wherein angular orientation of said spraying apparatus relative to the surface to be sprayed is manifested through angulation about said wheels.

* * * * *